(12) United States Patent
Hung

(10) Patent No.: US 6,216,825 B1
(45) Date of Patent: Apr. 17, 2001

(54) BRAKE MECHANISM

(76) Inventor: Chih-Cheng Hung, 8Fl., No. 171-3, Nang-Hwa Rd., Fengshan City, Kaohsiung Hsien (TW)

( * ) Notice: Subject to any disclaimer, the term of this patent is extended or adjusted under 35 U.S.C. 154(b) by 0 days.

(21) Appl. No.: 09/373,992

(22) Filed: Aug. 16, 1999

(51) Int. Cl.[7] ..................................................... B62L 3/00
(52) U.S. Cl. .......................... 188/24.22; 188/19; 74/489; 74/536
(58) Field of Search ........................ 188/2 D, 2 F, 24.21, 188/22.22, 19, 20, 21, 22; 74/489, 502.2, 535, 536, 533, 527

(56) References Cited

U.S. PATENT DOCUMENTS

| | | | |
|---|---|---|---|
| 4,907,794 | * | 3/1990 | Rose ................................... 280/43.24 |
| 5,020,560 | * | 6/1991 | Turbeville ............................. 188/75 |
| 5,279,180 | * | 1/1994 | Henriksson .......................... 74/502.2 |
| 5,927,441 | * | 7/1999 | Luo ....................................... 188/19 |
| 6,032,765 | * | 3/2000 | Hsi-Chia ............................... 188/19 |
| 6,098,487 | * | 8/2000 | Chien ................................... 74/502.2 |

* cited by examiner

*Primary Examiner*—Robert J. Oberleitner
*Assistant Examiner*—Thomas J. Williams
(74) *Attorney, Agent, or Firm*—Bacon & Thomas, PLLC

(57) ABSTRACT

A brake mechanism, which includes a mounting base fixedly fastened to the wheeled apparatus to be controlled, an actuating bar coupled between the mounting base and a brake cable at the wheeled apparatus, and a brake lever pivoted to the mounting base for operation by hand to move the actuating bar, wherein the brake lever is operated by hand and shifted between a first position where the brake cable is pulled up to stop the wheeled apparatus and the brake cable will be released when releasing the brake lever from the hand, a second position where the brake mechanism stands idle, and a third position where the brake cable is maintained pulled up and will not be released from the braking position when releasing the brake lever from the hand.

2 Claims, 3 Drawing Sheets

BRAKE MECHANISM

BACKGROUND OF THE INVENTION

The present invention relates to a brake mechanism for fastening to a particular part of a wheeled apparatus, for example, the hand grip of a wheeled chair, for controlling movement of the wheels.

A variety of wheeled chairs have been disclosed, and intensively used to help people walk. U.S. Pat. Nos. 4,907, 794 and 5,020,560 disclose different folding collapsible wheeled chairs. Because these wheeled chairs are moved by means of wheels, brake means should be installed. However, regular brake means for this purpose can only temporarily stop the wheeled chair. Recently, dual braking mode brake means with temporary braking function and continuous braking function have been developed. When the brake lever is pushed downwards, the brake means is shifted to the continuous braking position (the braking status remains unchanged when the user releases the brake lever). Similar disclosures are seen in U.S. Pat. No. 5,279,180 and Taiwan Pat. No. 199339.

U.S. Pat. No. 5,279,180 discloses another type of brake structure having a driving member. When the brake lever is pushed downwards, the brake lever is "locked" at the base frame to achieve a continuous braking operation. The locking force must surpass the return force of the brake cable so that the brake cable can be maintained pulled up. However, this design has drawbacks as follows:

1. Frequently operating the continuous braking function causes the contact area between the brake lever and the base frame to wear quickly. When the contact area between the brake lever and the base frame starts to wear, the locking of the brake becomes unstable.
2. Because the locking force of the brake lever must surpass the return force of the brake cable, much effort should be employed to the brake lever against the return force of the brake cable when pushing the brake lever downwards, and the applied force greatly increases the rubbing of the brake lever against the base frame.

SUMMARY OF THE INVENTION

It is the main object of the present invention to provide a brake mechanism, which is highly stable in function, and durable in use. According to the present invention, the brake mechanism comprises a mounting base, a brake lever, and an actuating bar.

The mounting base comprises a mounting portion and a chamber. The mounting portion is for enabling the brake mechanism to be fastened to a particular part of the wheeled apparatus to be controlled. The actuating bar and the front end of the brake lever are inserted into the chamber and respectively pivoted to the mounting base in such a manner that the actuating bar can be moved by the brake lever.

The brake lever has a front actuating portion pivoted to the mounting base. The actuating portion comprises two hooked angles bilaterally disposed at the back.

The actuating bar is suspended behind the actuating portion of the brake lever and coupled between the mounting frame and the brake cable at the wheeled apparatus to be controlled, having a first peripheral edge, a second peripheral edge, and a third peripheral edge.

The brake lever is operated to move the hooked angles between the first peripheral edge, second peripheral edge and third peripheral edge at the actuating bar, so as to further provide three operation modes, namely, the temporary braking function, the continuous braking function, and the brake release function.

DETAILED DESCRIPTION OF THE PREFERRED EMBODIMENT

Figure 1:
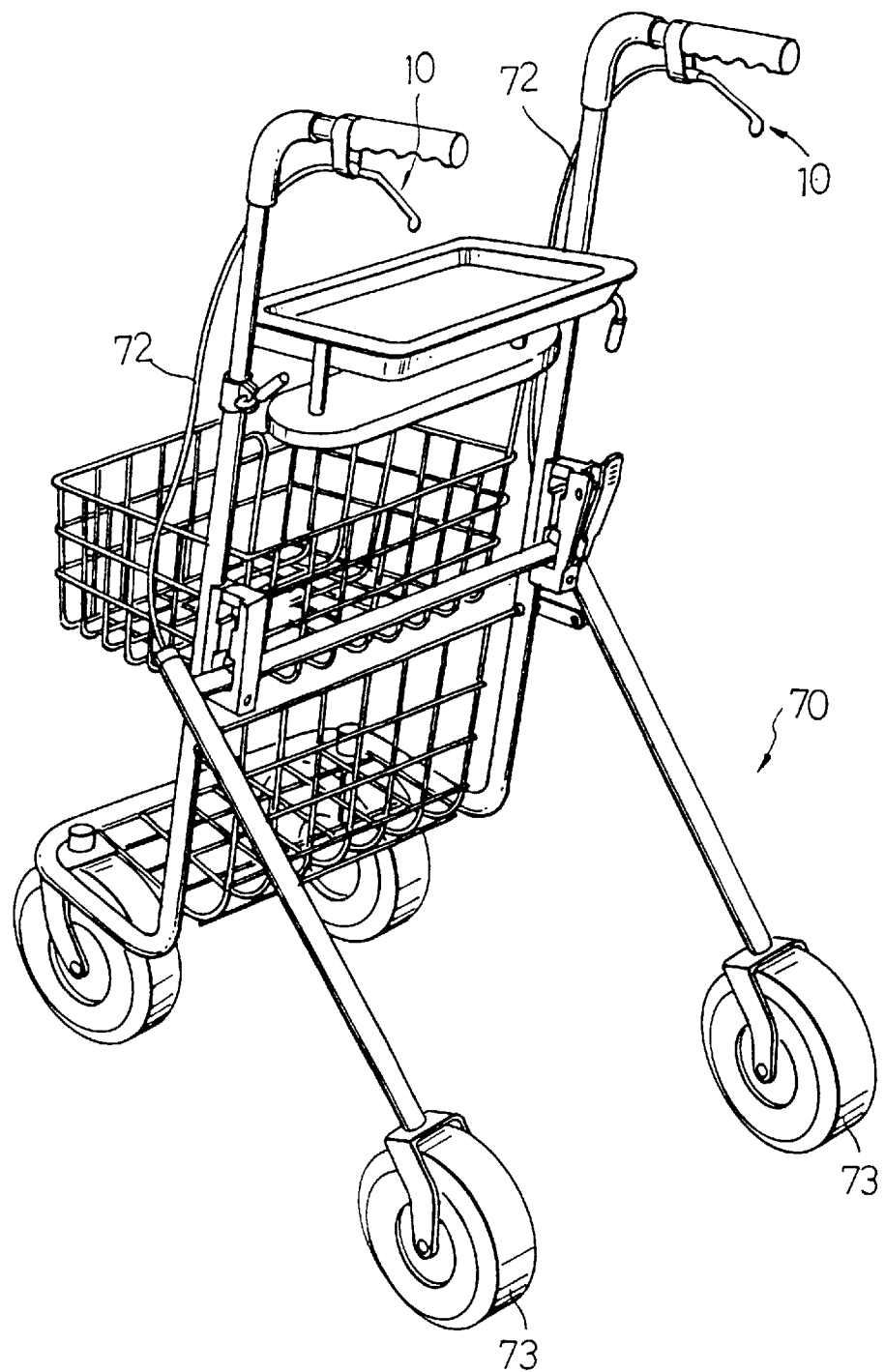
FIG. 1 is an applied view of the present invention, showing the brake mechanism installed in a wheeled chair.

Referring to FIG. 1, the brake mechanism 10 of the present invention is used in a wheeled chair 70 for controlling movement of the wheels 73 of the wheeled chair 70.

Figure 2:
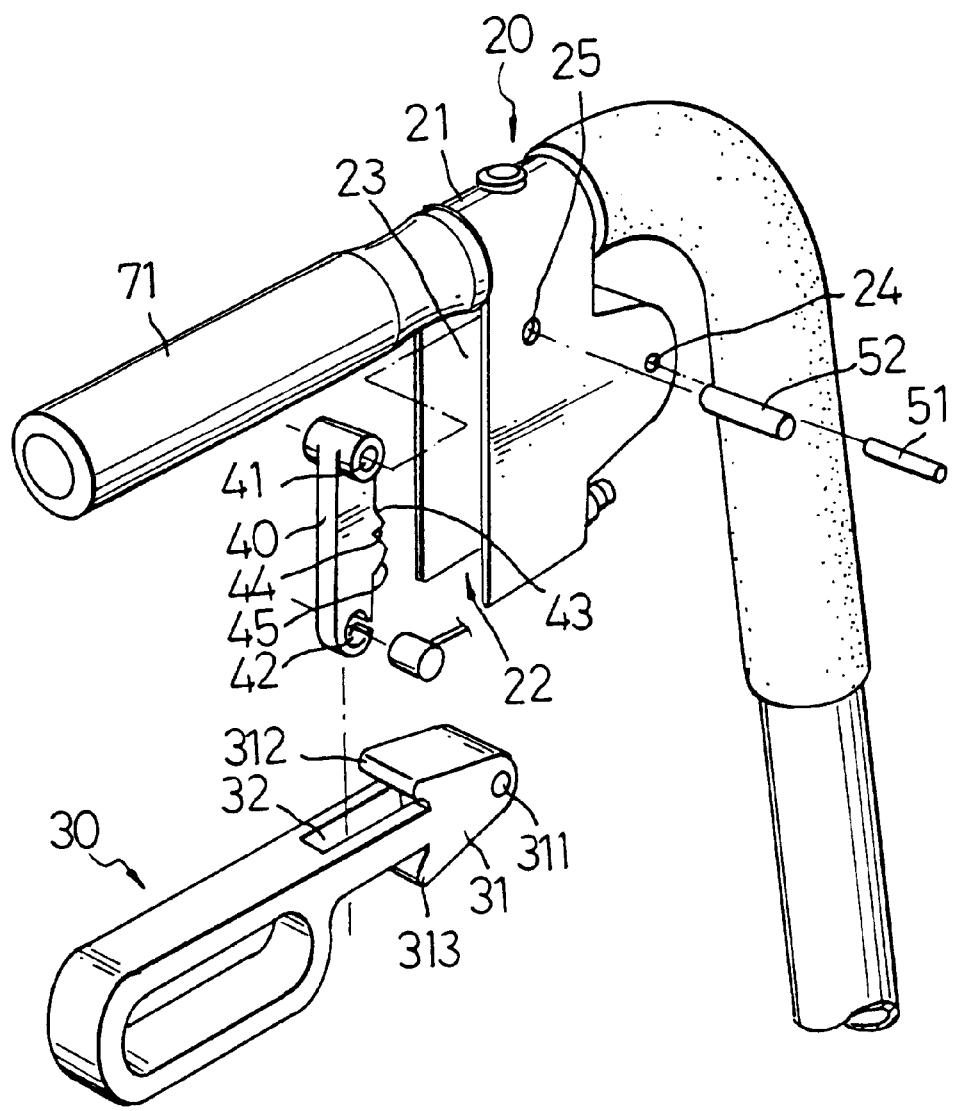
FIG. 2 is an exploded view of the brake mechanism according to the present invention.

Referring to FIG. 2 and FIG. 1 again, the brake mechanism 10 comprises a mounting base 20, a brake lever 30, and an actuating bar 40.

The mounting base 20 comprises a mounting portion 21, and a chamber 22. The mounting portion 21 is for enabling the brake mechanism 10 to be fastened to a part, for example, one hand grip 71 of the wheeled chair 70. The chamber 22 has an opening 23, which enables the actuating bar 40 and the front end of the brake lever 30 to be inserted into the chamber 22. Further, a pair of first pivot holes 24 and a pair of second pivot holes 25 are provided at the mounting base 20 at two opposite side walls of the chamber 22 for the mounting of the brake lever 30 and the actuating bar 40.

The brake lever 30 is provided for operation by hand to control the brake mechanism 10, comprising an actuating portion 31 at the front end, and a slot 32 behind the actuating portion 31. As illustrated, the actuating portion 31 is shaped like an arrowhead, having a pivot hole 311, a first hooked angle 312, and a second hooked angle 313. The pivot hole 311 of the actuating portion 31 is pivotally connected between the pair of first pivot holes 24 at the mounting base 20 by a pivot 51. The first hooked angle 312 and the second hooked angle 313 are respectively protruded from the rear side of the actuating portion 31.

The actuating bar 40 is inserted through the slot 32 at the brake lever 30, comprising a pivot hole 41 at one end, a brake cable locating portion 42 at an opposite end, a first peripheral edge 43, a second peripheral edge 44, and a third peripheral edge 45. The pivot hole 41 of the actuating bar 40 is pivotally connected between the second pivot holes 25 at the mounting base 20 by a pivot 52. The brake cable locating portion 42 holds one end of a brake cable 72 at the wheeled chair 70. The opposite end of the brake cable 72 is connected to a brake shoe assembly at one wheel 73 of the wheeled chair 70. Because the function and mounting arrangement of the brake cable 72 and the brake shoe assembly are obvious to those skilled in the art and not within the scope of the present invention, they are not described in detail.

According to the present preferred embodiment, the first peripheral edge 43 is disposed above the second peripheral edge 44, and the second peripheral edge 44 is disposed above the third peripheral edge 45. The second peripheral edge 44 and the third peripheral edge 45 form a recess therebetween.

The operation of the brake mechanism is described hereinafter with reference to Figures from 3 through 5.

Figure 3:
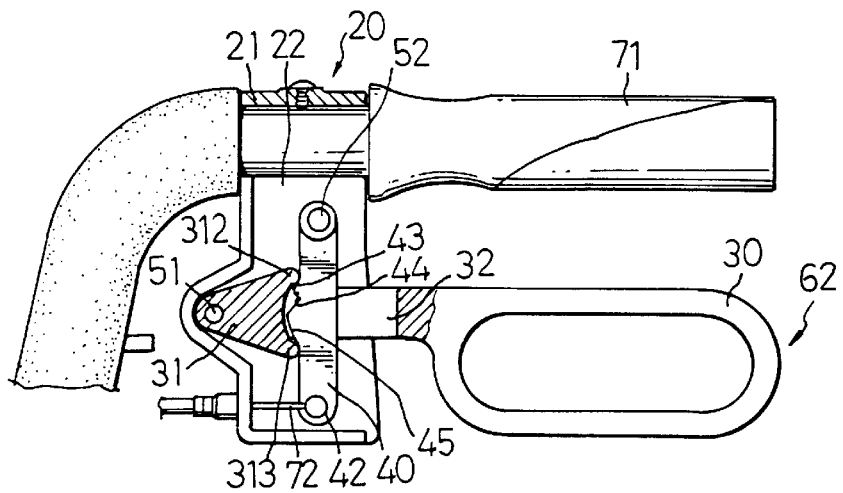
FIG. 3 shows the brake mechanism maintained in the first position.

As illustrated in FIG. 3, when not operated, the brake lever 30 is maintained in a second position 62 where the second hooked angle 313 is stopped at the top of the first peripheral edge 43 of the actuating bar 40.

Figure 4:
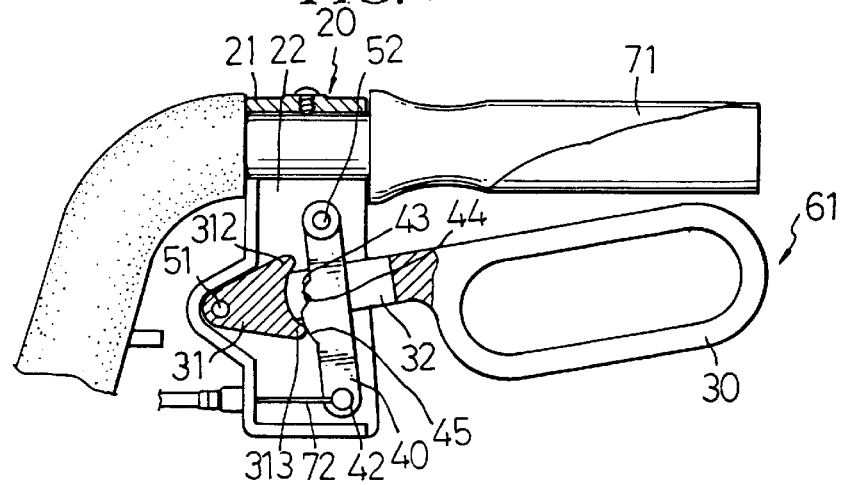
FIG. 4 shows the brake mechanism maintained in the second position.

As illustrated in FIG. 4, when the user pulls up the brake lever 30, the second hooked angle 313 of the brake lever 30 is moved to the third peripheral edge 45, causing the brake cable 72 to be pulled up with the brake cable locating portion 42. At this stage, the brake lever 30 is maintained in a first position 61 to achieve a temporary brake operation, and the return force of the brake cable 72 immediately pulls the brake lever 30 back to the second position 62 upon release of the brake lever 30.

Figure 5:
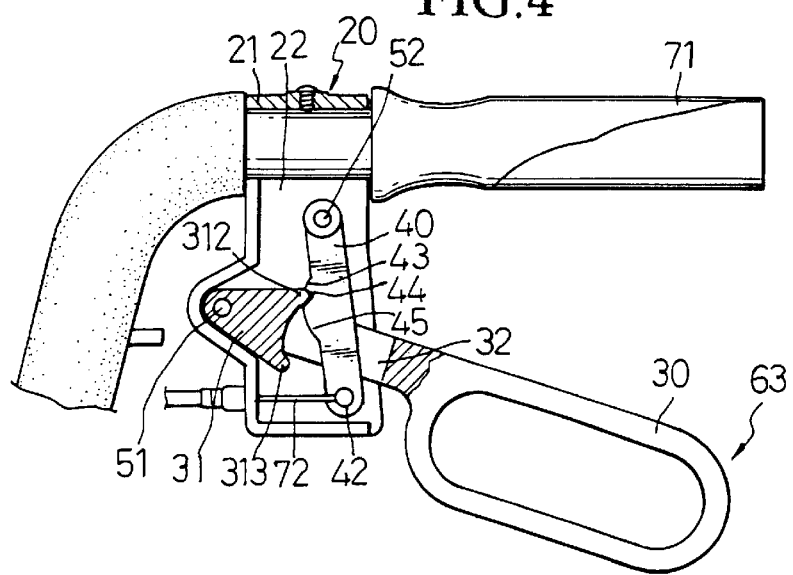
FIG. 5 shows the brake mechanism maintained in the third position.

As illustrated in FIG. 5, when the user pushes the brake lever 30 downwards, the first hooked angle 312 of the brake lever 30 is forced to hook in between the second peripheral edge 44 and the third peripheral edge 45 at the actuating bar 40. At this stage, the brake lever 30 is maintained in a third position 63 to achieve a continuous brake operation, and the position of the brake lever 30 is remained unchanged when released from the hand. When releasing the continuous brake operation, the brake lever 30 is pulled upwards with the hand from the third position 63 to the second position 62 or first position 61.

While only one embodiment of the present invention has been shown and described, it will be understood that various modifications and changes could be made thereunto without departing from the spirit and scope of the invention disclosed. For example, the elevation position of the pivot holes at the mounting base, the relative position between the first peripheral edge and the second peripheral edge, or the angle, number and shape of the peripheral edges at the actuating bar may be changed as desired.

What the invention claimed is:

1. A brake mechanism installed in a wheeled apparatus and controlled to stop movement of the wheeled apparatus, comprising:

a mounting base, said mounting base comprising a mounting portion fixedly fastened to the wheeled apparatus, and a chamber;

a brake lever pivoted to said mounting base for operation by hand, said brake lever comprising a front actuating portion inserted into said chamber and pivoted to said mounting base, said actuating portion having a first hooked angle and a second hooked angle;

an actuating bar mounted in said chamber, said actuating bar comprising a top end pivoted to said mounting base at an elevation above the first hooked angle of said brake lever, a bottom end connected to one end of a brake cable and suspended below the second hooked angle of said brake lever, and a plurality of peripheral edges spaced between said top end and said bottom end, said peripheral edges including a first peripheral edge, a second peripheral edge, and a third peripheral edge;

said brake lever has a slot behind said front actuating portion through which said actuating bar passes; and wherein said brake lever is operated by hand and shifted between a first position, where the second hooked angle of said brake lever is stopped at the third peripheral edge at said actuating bar and said brake cable is pulled up, and said brake cable will be released when releasing said brake lever from the hand at this stage, a second position where the first hooked angle of said brake lever is stopped at the first peripheral edge at said actuating bar and the brake mechanism stands idle, and a third position where the first hooked angle of said brake lever is stopped between the second peripheral edge and third peripheral edge at said actuating bar and said brake cable is pulled up, and said brake cable will be maintained pulled up when releasing said brake lever from the hand at this stage.

2. A brake mechanism installed in a wheeled apparatus and controlled to stop movement of the wheeled apparatus, comprising:

a mounting base, said mounting base comprising a mounting portion fixedly fastened to the wheeled apparatus, and a chamber;

a brake lever pivoted to said mounting base for operation by hand, said brake lever comprising a front actuating portion inserted into said chamber and pivoted to said mounting base, said actuating portion being shaped like an arrowhead and having a first hooked angle and a second hooked angle; and an actuating bar mounted in said chamber, said actuating bar comprising a top end pivoted to said mounting base at an elevation above the first hooked angle of said brake lever, a bottom end connected to one end of a brake cable and suspended below the second hooked angle of said brake lever, and a plurality of peripheral edges spaced between said top end and said bottom end, said peripheral edges including a first peripheral edge, a second peripheral edge, and a third peripheral edge; and wherein said brake lever is operated by hand and shifted between a first position, where the second hooked angle of said brake lever is stopped at the third peripheral edge at said actuating bar and said brake cable is pulled up, and said brake cable will be released when releasing said brake lever from the hand at this stage, a second position where the first hooked angle of said brake lever is stopped at the first peripheral edge at said actuating bar and the brake mechanism stands idle, and a third position where the first hooked angle of said brake lever is stopped between the second peripheral edge and third peripheral edge at said actuating bar and said brake cable is pulled up, and said brake cable will be maintained pulled up when releasing said brake lever from the hand at this stage.

* * * * *